United States Patent Office 3,305,173
Patented Feb. 21, 1967

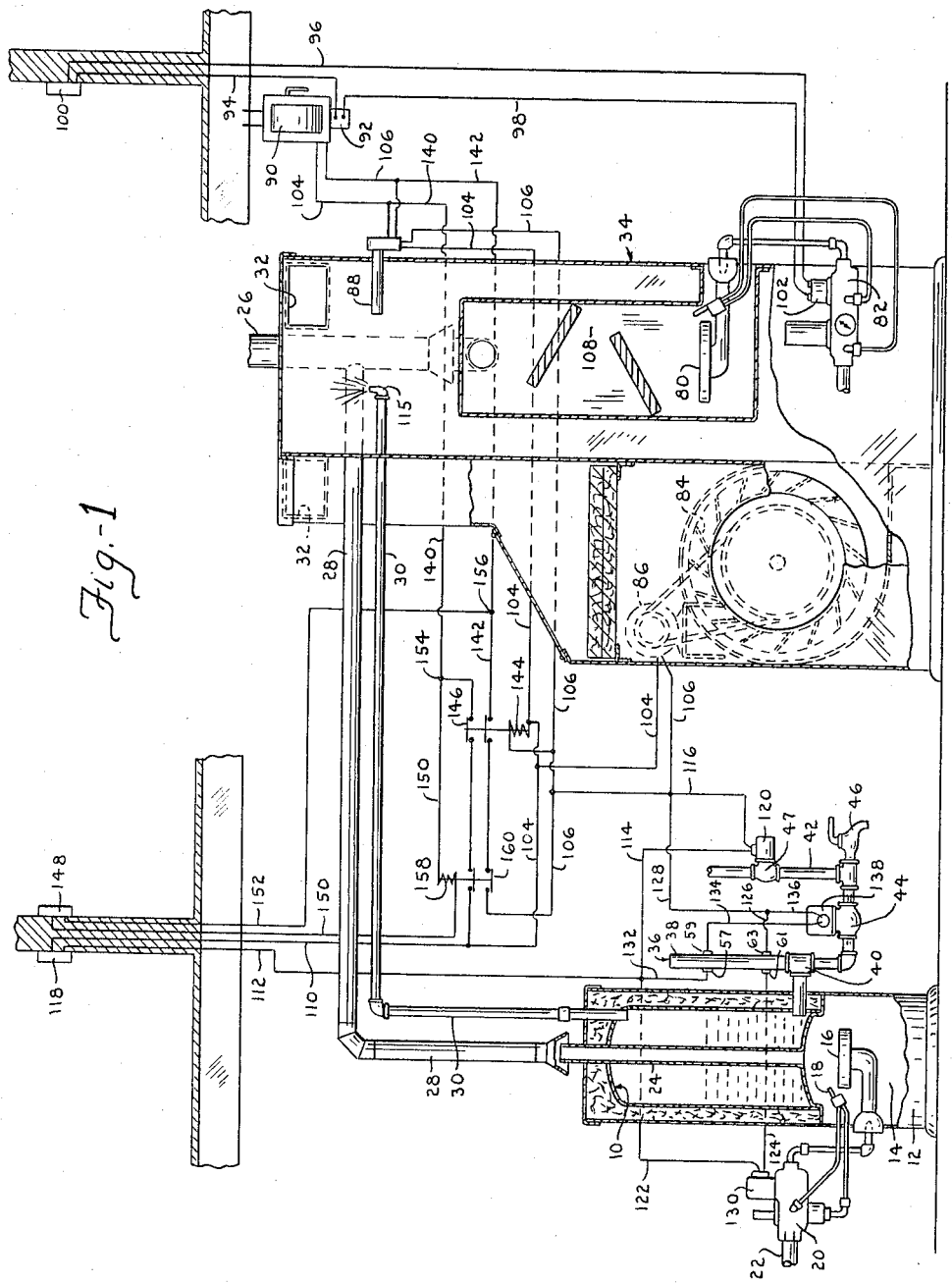

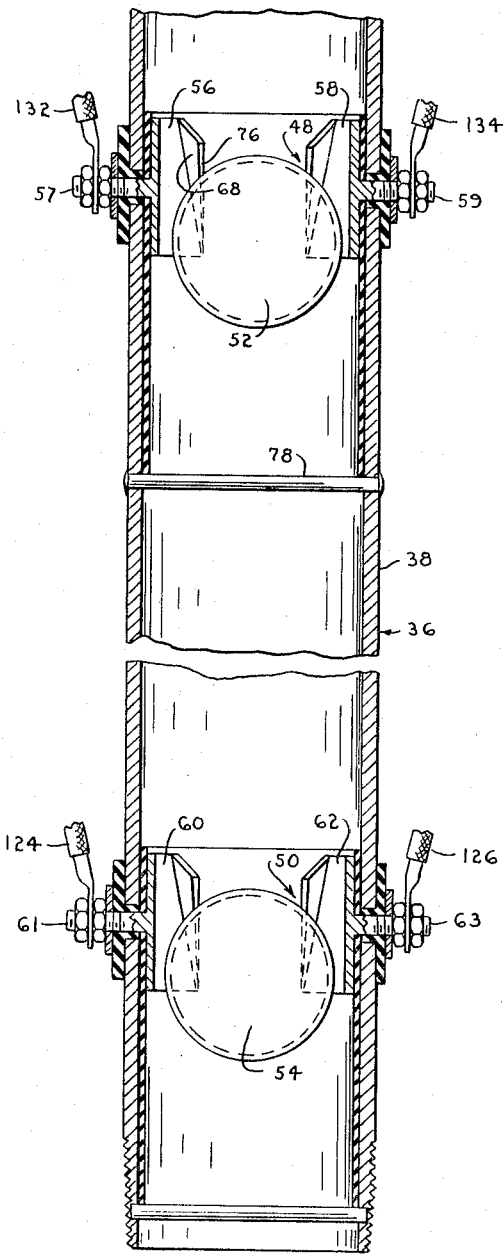
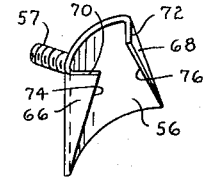
Fig.-3
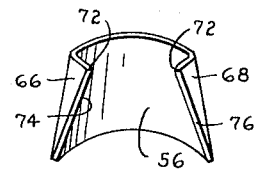
Fig.-4
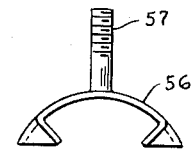
Fig.-5
Fig.-2
INVENTOR.
RALPH H. BECKMAN
BY Walter Leuca
ATTORNEY

3,305,173
HUMIDIFIER APPARATUS AND CONTROL
Ralph H. Beckman, 817 E. 41st Ave., Gary, Ind. 46409
Filed Feb. 26, 1965, Ser. No. 435,548
2 Claims. (Cl. 236—9)

This invention relates to humidifying systems and more particularly to an improved humidifier apparatus and control therefor for a forced air duct system.

Prior art humidifiers include an open top container or pan supported in the furnace plenum for holding a quantity of water. The water is evaporated by the heat of the furnace and is automatically replenished by the operation of a float valve. The evaporation is expedited by providing absorption elements in the container which draw the water to the surface by capillary action and thereby provide a larger evaporating surface than the surface area of the open top of the container. The above described conventional humidifier is very inefficient due to the fact that the heat of the furnace is relied upon to accomplish substantial evaporation. Many furnaces in present use are of the forced air type which operate as a source of heat for a short period of time since the blower associated therewith circulates the heated air rapidly causing the heated air to reach the rooms registered therewith and the thermostatic control therein very quickly. The thermostatic control, in responding to the presence of the warm air, operates to shut off the heating apparatus of the furnace before the water in the container is heated sufficiently for any real and sustained evaporation. As a further disadvantage, the absorption elements in the container become occluded with impurities from the water with the result that the evaporating efficiency is diminished to a point whereby the absorption elements are rendered useless for the purpose intended.

Another disadvantage of the conventional humidifier is to be found in the fact that the evaporation is dependent upon the heat of the furnace. If the ambient temperature is not low enough, the furnace will not be put in operation and consequently there will be no evaporation of the humidifying water even though the humidity is low.

Other prior art humidifiers operate on the spray principle. Some of which I am aware, generally comprise a semi-circular well containing water which is attached to the central duct at an opening therein. A motorized cylindrical brush is rotatably supported in the well and when the signal is given for humidification, the motor operates to rotate the brush. As bristles of the brush emerge from the water, it sprays the water into the central duct and the current of hot air carries the droplets of water into the rooms. A marked disadvantage of this type humidifier is that the spray droplets are large and therefore, not all the water sprayed in the duct will be evaporated and carried into the rooms to humidify the atmosphere. Also, such an effusion of water will accumulate at joints and openings and cause parts of the ductwork to rust. Another disadvantage is that sediments in the water will accumulate in the brush and render it incapable of delivering a fine spray of water into the air current through the duct requiring frequent dismantling of the humidifier and cleaning thereof for efficient operation.

Accordingly, the objectives of the present invention are: to provide a humidifier apparatus and controls therefor for a forced air duct system which provides humidification to the air circulating in the duct system rapidly and in large quantity; to provide a humidifier apparatus and controls therefor which will distribute the air in the system until the humidity is equal throughout; and, to provide a humidifier and controls therefor which are simple and economical to install and to operate.

Other objects and advantages of this invention will become more apparent after a careful study of the specification having reference to the drawings, a preferred form and construction of which is illustrated in the following figures:

FIGURE 1 is an elevation of my invention shown partly in section and shown in operative relation to a forced hot air furnace. Also illustrated is the schematic wiring of the control circuit;

FIGURE 2 is a detail showing, in fragment, of the water flow control for the reservoir; and FIGURES 3, 4 and 5 are respectively, a perspective view, a frontal view and a top view of one of the contactors of the water level control showing the detail structure thereof.

Referring now to the drawings and for the present particularly to FIGURE 1, reference numeral 10 designates the reservoir of my invention which is an insulated tank extending upright from a base portion 12 which is adapted to provide a heating chamber 14. The burner 16 in the heating chamber 14 is illustrated as a gas burner positioned in proximity with the reservoir 10 to transmit the heat of the flames thereto. It is conventionally provided with a pilot burner 18, gas control valve 20, and a gas supply pipe 22 shown in fragment. Reservoir tank 10 is provided with a centrally extending waste pipe 24 which communicates with the chimney pipe 26 by means of a flue pipe 28. Steam pipe 30 is connected to reservoir 10 to communicate the interior thereof with the extended plenum 32, shown in cross-section, of a blower type hot air furnace designated generally by the numeral 34.

Reservoir water level control means 36 operates to automatically control the supply of water to reservoir tank 10. It comprises a standpipe 38 which is connected at one end to the water inlet pipe 40. Pipe 38 extends substantially vertically from inlet pipe 40 a short distance above the desired level of the water in reservoir 10. Standpipe 38 is preferably connected to the exterior of reservoir 10 for support and is substantially parallel thereto and communicates therewith through inlet pipe 40 and together with reservoir 10 to form a U tube apparatus wherein the water in standpipe 38 and the water in reservoir 10 are maintained at the same level. Water supply pipe 42 is connected to inlet pipe 40 through means of a solenoid operated, normally closed valve 44. Numeral 46 designates a discharge cock for reservoir 10. Also included in water supply pipe 42 is a solenoid operated, normally open valve 47.

Shown in greater detail in FIGURES 2–5, standpipe 38 is provided with vertically spaced, current conductor contact means 48 and 50 which comprise free floating spheres 52 and 54, respectively, and diametrically disposed plate members 56 and 58, and 60 and 62, respectively. Each of said plate members are insularly connected to the interior of pipe 38 through diametrically opposed holes provided therein by means of a bolt and nut assembly designated generally by the numerals 57 and 59, and 61 and 63, respectively. These bolt and nut assemblies, above designated, also serve as connecting terminals for the respective plate members. Each of plate members 56, 58, 60 and 62 is identical in structure, therefore, the detail structure of only one will be described. Contact elements or edges 74 and 76 of plate member 56 are provided by angulating the opposite ends 66 and 68 of member 56 so that the upper corners 70 and 72 thereof extend radially inward of pipe 38 in such a manner that the edges 74 and 76 of said ends 66 and 68, respectively, are inclined to serve as centering guides for sphere 52 floatably moving therealong. This structure of plate members 56 and 58, and 60 and 62 when connected to standpipe 38 in diametrically opposed pairs not only provide centering means and contact means with spheres 52 and 54, respectively, when spheres 52 and 54 are buoyed upward thereagainst with the rise of water in standpipe 38, but also, function as scrapers which by the action of the free movement of spheres 52 and 54, results in a self-cleaning operation therebetween, thereby assuring good contact at all times for the completion of a circuit across diametrically opposed pairs of plate members 56 and 58, and 60 and 62, respectively. In the event water in standpipe 38 recedes to the level of contact means 50 or therebelow, sphere 52 will lower to contact means 50 completing a circuit thereacross. To avoid this, I interpose a grid 78 approximately midway between contact means 48 and 50 to prevent contact of sphere 52 with plate members 60 and 62 of contact means 50, which of course will present no hindrance to the rise and fall of water in standpipe 38.

Numerals 80, 82, 84, 86 and 88 designate a burner including a pilot light, a fuel control means, a blower, a blower motor and blower motor control switch, respectively, in furnace 34. These, of course, are conventional components of a forced hot air furnace and further descriptions are unnecessary. The control means for furnace 34 includes an electrical circuit comprising a switch box 90 from which the line voltage is distributed, a thermostat circuit including transformer 92, lines 94, 96 and 98, room thermostat control 100, solenoid 102 for operating a normally closed fuel control valve 82 so that when the ambient room temperature falls below the thermostat setting, the thermostat control 100 closes, closing the circuit of lines 94, 96 and 98 to solenoid 102 thereby operating fuel control valve 82 to supply fuel to furnace burner 80 which is ignited by an adjacent pilot light to provide heat in the furnace. The blower motor circuit includes lines 104 and 106, temperature control 88, and blower motor 86 so that when the temperature of the fire box 108 reaches the limit of the temperature for which control 88 is set, the thermostatic switch in control 88 will close the circuit of lines 104 and 106 to blower motor 86 setting it in operation together with blower 84 to circulate the heated air through the extended plenum 32 and the connecting ductwork system.

This invention includes the humidistat control circuit comprising lines 104, 110, 112, 114, 116 and 106, relay coil 144 of contact switch 146, humidistat control 118, solenoid 120 of water valve 47. When blower motor 86 is put into operation by closing its circuit at temperature control 88, and humidistat control 118 operates due to lack of humidity, the circuit of lines 104, 110, 112, 114, 116 and 106 is closed and solenoid 120 is energized to open water valve 47, thereby making water available for the humidifying apparatus of this invention while in operation. Also energized is relay coil 144 which operates to open contact switch 146 which will be described hereinafter. With the closing of temperature control 88 and humidistat control 118, a second humidistat circuit is completed. This second circuit comprises lines 122, 124, 126, 128 and 106, and solenoid 130 of fuel control valve 20, and the terminals 61 and 63 of contact means 50 of water level control means 36. Solenoid 130 operates to open fuel control valve 20 to supply fuel to burner 16 which is ignited by pilot light 18 to heat the water in reservoir 10 for the production of steam. As long as there is a sufficient supply of water in reservoir 10, contact means 50 is maintained closed by the buoyant force of water in pipe 38 acting on sphere 54 against contact edges of plate members 60 and 62. Contact 50 is interrupted when the water in standpipe 38 recedes below the preset level of contact 50. The water in reservoir 10 at this level indicates a leak or a discharge from reservoir 10 or other abnormal function of the humidifier system necessitating an automatic stoppage of the production of heat for reservoir 10. The circuit thus interrupted at contact 50, solenoid 130 will be deenergized causing fuel control valve 20 to stop the flow of fuel to burner 16. This second humidistat circuit includes another water level control circuit comprising lines 132, 134, 136, 128 and 106, and the terminals 57 and 59 of contact means 48 of water level control means 36. This circuit is designed to interrupt at contact 48 when the water in standpipe 38 recedes below the preset level of contact 48 causing the deenergization of solenoid 138 and the opening of normally closed valve 44 to admit water into reservoir 10 until the level of the water in standpipe 38 is raised to close contact 48. With the closing of contact 48, this circuit is completed energizing solenoid 138 and closing valve 44.

My control also includes a temperature control bypass circuit comprising lines 140 and 142 which connect blower motor circuit lines 104 and 106, respectively, shunting temperature control 88. Line 104 includes a relay coil 144 which actuates contact switch 146 which completes or interrupts the circuit of lines 140 and 142 of the temperature control bypass circuit. That is, when temperature control 88 of furnace 34 operates to close the circuit of lines 104 and 106, relay 144 is energized to maintain contact switch 146 open thereby maintaining the circuit of lines 140 and 142 interrupted; and when temperature control 88 opens or interrupts the circuit of lines 104 and 106, relay 144 is deenergized causing contact switch 146 to close completing bypass circuit 140 and 142. This latter circuit allows the humidifying system of my invention to remain in operation when the ambient temperature is sufficiently high so that furnace 34 is not put into operation but still the humidity is sufficiently low to require the humidifying system to operate to provide humidity.

A humidistat auxiliary circuit comprising humidistat control 148 mounted either adjacent to or distant from humidistat control 118, lines 150 and 152 to humidistat control 148 are connected to lines 140 and 142 at junction 154 and 156, respectively. One of said lines, 150, includes relay 158 which actuates normally open contact switch 160 to close when humidistat control 148 closes the circuit of lines 140, 150, 152 and 142. The purpose of this humidistat auxiliary circuit is to continue the operation of the blower motor 86 until the humidity throughout the entire system is the same at which time the blower motor 86 is stopped.

To recapitulate the operation of my invention; if the humidity is sufficiently elevated, the humidistats 118 and 148 will be open and the circuits of lines 110 and 112, and 150 and 152 will be interrupted with the result that the humidifying system of my invention will not be in operation. Furnace 34 will operate independent of the humidifying system since the furnace will operate in accordance with the thermostat control 100 responsivity to the ambient temperature. If the ambient temperature falls below the setting on thermostat 100, the circuit of lines 94, 96 and 98 will be completed to operate gas control valve 82 causing burner 80 of furnace 34 to ignite. When sufficient heat is provided in fire box 108 of furnace 34, temperature control 88, responding thereto, will operate to close the circuit of lines 104 and 106 to blower motor 86 operating said motor to rotate blower 84 to circulate the heated air through plenum and ductwork 32. Relay 144 being in the circuit of line 104 will be energized operating contact switch 146 to remain open maintaining the circuit of lines 140 and 142 in an interrupted state. When the humidity falls below a preset value for which humidistat control 118 was set, humidistat control 118 will operate to complete the circuit of lines 110 and 112 which energizes the circuit of solenoid 130 of gas control valve 20 opening said control valve and causing burner 16 to ignite for heating the water in reservoir 10. The circuit to solenoid 138 of water valve 44 is also completed through water level control contact 50 to maintain water valve 44 in a closed position. Simultaneously, the circuit to solenoid 120 is completed to open and maintain water valve 47 in an open position. Since the heat output of the burner 16 and a quantity of water in reservoir 10 are such to produce steam within a short time, that is within several minutes, humidity in the form of steam vapor issues from the end 115 of steam pipe 30 into the extended plenum 32 of the furnace and is distributed throughout the ductwork and the rooms associated therewith by means of blower 84 until the humidity increases to the desired value. The humidistat control 118 responding to the increased humidity operates to open the circuit of lines 110 and 112 causing solenoid 130 of gas control valve 20 to deenergize and stopping the flow of gas to burner 16. Solenoid 138 of water valve 44 is also deenergized causing water valve 44 to open, however, opening water valve 44 is ineffectual regarding the flow of water therethrough since solenoid 120 is simultaneously deenergized which operates to close water valve 47 and since cock 46 is normally closed the water in the reservoir system remains in equilibrium.

In the event the ambient temperature in the rooms is above the temperature setting on thermostat control 100, the thermostat circuit comprising lines 94, 96 and 98 will be open at said thermostat control preventing the furnace from being put in operation. With this condition the temperature control circuit of lines 104 and 106 will also be open preventing a completed circuit to blower motor 86; therefore, temperature control bypass circuit is provided. It comprises lines 140 and 142, contact switch 146 actuated to close upon the deenergization of relay 144, and normally closed contact switch 160 actuated to open by relay 158 in humidistat auxiliary circuit. Accordingly, the humidistat system together with motor 86 and blower 84 will be put into operation if the humidity of the ambient air, as determined by humidistat controls 118 and 148, is below the setting of humidistat controls 118 and 148 even if furnace 34 is not in operation. When sufficient humidity is provided by my invention, humidistat control 118 will interrupt the circuit of lines 110 and 112 stopping the production of water vapor. However, the blower motor 86 will continue operation of blower 84 to distribute the air throughout the rooms until the humidity in the room in which humidistat control 148 is located is brought in equilibrium with the humidity in the room in which humidistat control 118 is located whereupon humidistat control 148 opens the circuit of lines 150 and 152 deenergizing relay coil 158 and opening contact switch 160 to stop blower motor 86. It is, therefore, obvious that my invention provides an additional advantage in that humidistat control 118 and 148 may be located in different portions of a building so that the system may be operated to provide an equal state of humidity throughout the entire building instead of providing a humidifying system which satisfies only one humidistat control 118 wherever it may be located while another portion of the building, due to location, construction or restrictions to flow of air will remain lacking in humidity.

While I have shown and described only a preferred embodiment of my invention, it is obvious that the apparatus and control of my invention are susceptible of modifications without departing from the spirit of my invention. Therefore, I do not wish to be limited by the disclosure set forth, but only by the scope of the appended claims.

I claim:

1. A humidifier system and control for supplying water vapor to a forced air furnace system wherein said furnace system includes ductwork for distribution of air, a thermostat circuit controlling the heating means of said furnace, and a thermostat circuit controlling motor means for impelling said air through said ductwork, comprising:
    a reservoir for containing water having a water inlet, a water vapor outlet, heating means, and a control for said heating means,
    a first and second valve in said water inlet of said reservoir, said valves having electromotive means for operating said valves;
    means for sensing an upper limit of water level in said reservoir;
    means for sensing a lower limit of water level in said reservoir;
    a humidity sensing means comprising a circuit connecting said thermostat circuit controlling said motor means for impelling said air, including,
        said control for said heating means of said reservoir,
        said means for sensing said lower limit of water level therein, and
        said electromotive means of said second valve in said water inlet;
    said humidity sensing means comprising a second circuit, including,
        said means for sensing said upper limit of water level in said reservoir, and
        said electromotive means of said first valve in said water inlet;
    an electromotive means in said thermostat circuit of said motor means;
    an auxiliary circuit connecting said humidistat sensing means circuit and said thermostat circuit of said motor means whereby said thermostat of said circuit is bypassed;
    a switch means in said auxiliary circuit operable by said electromotive means in said thermostat circuit of said motor means;
    a second humidity sensing means comprising a circuit connecting said auxiliary circuit;
    an electromotive means in said second humidity sensing means circuit; and
    a second switch means in said auxiliary circuit operable by said electromotive means in said second humidity sensing means circuit.

2. A humidifier system and control for supplying water vapor to a forced air furnace system wherein said furnace system includes ductwork for distribution of air, a thermostat circuit controlling the heating means of said furnace, and a thermostat circuit controlling motor means for impelling said air through said ductwork, comprising:
    a reservoir for containing water having a water inlet, a water vapor outlet, heating means, and a control for said heating means;
    a valve in said water inlet of said reservoir adjacent said reservoir, said valve having electromotive means for operating said valve to close when said electromotive means is energized;
    a second valve in said water inlet of said reservoir removed from said reservoir, said valve having electromotive means for operating said second valve to close when said electromotive means is deenergized;
    means for sensing an upper limit of water level in said reservoir;
    means for sensing a lower limit of water level in said reservoir;
    a humidistat circuit connecting said thermostat circuit controlling said motor means for impelling said air, said humidistat circuit comprising,
        a first circuit including,
            a humidity sensing means,
            said control for said heating means of said reservoir,
            said means for sensing said lower limit of water level therein,
            said electromotive means of said second valve in said water inlet; and
        a second circuit including,
            said humidity sensing means,
            said means for sensing said upper limit of water level in said reservoir, and
            said electromotive means of said first valve in said water inlet;
    an electromotive means in said thermostat circuit of said motor means being energized when said motor means is operating;

an auxiliary circuit connecting said humistat sensing means circuit and said thermostat circuit of said motor means whereby said thermostat of said motor means circuit is bypassed;

a switch means in said auxiliary circuit operable by said electromotive means in said thermostat circuit of said motor means to close when said electromotive means is deenergized;

a second humidistat circuit connecting said auxiliary circuit, including,
- a second humidistat, and
- an electromotive means; and a second switch means in said auxiliary circuit operable by said electromotive means in said humidistat circuit to close when said electromotive means is energized.

References Cited by the Examiner

UNITED STATES PATENTS

| | | | |
|---|---|---|---|
| 1,674,337 | 6/1928 | Klees et al. | 126—113 |
| 2,328,538 | 9/1943 | Furlong | 126—113 |
| 2,804,067 | 8/1957 | Elgin | 126—113 |
| 2,810,381 | 10/1957 | Knight | 126—113 |

EDWARD J. MICHAEL, *Primary Examiner.*